(12) United States Patent
Kling et al.

(10) Patent No.: US 12,736,009 B1
(45) Date of Patent: Sep. 15, 2026

(54) SGV ACOUSTIC LINER RETENTION

(71) Applicant: RTX Corporation, Farmington, CT (US)

(72) Inventors: Colin Kling, Exton, PA (US); David A. Welch, Quaker Hill, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/334,324

(22) Filed: Sep. 19, 2025

(51) Int. Cl.
*F02C 7/24* (2006.01)
*G10K 11/18* (2006.01)

(52) U.S. Cl.
CPC ................ *F02C 7/24* (2013.01); *G10K 11/18* (2013.01); *F05D 2260/96* (2013.01)

(58) Field of Classification Search
CPC . F01D 9/041; F01D 5/147; F01D 5/16; F01D 5/18; F01D 9/02; F01D 9/042; F01D 5/141; F05D 2220/36; F05D 2260/96; F05D 2260/963; F05D 2250/283; F05D 2250/191; F05D 2240/121; F05D 2240/123; F05D 2240/122; F05D 2260/36; F05D 2300/612; F05D 2300/615; F02C 7/24; F02C 7/045; F02K 3/06; F02K 1/827; F04D 29/324; F04D 29/665; F04D 29/681; F01N 1/023; G10K 11/18
See application file for complete search history.

(56) References Cited

U.S. PATENT DOCUMENTS 7,607,287 B2 * 10/2009 Reba .................... F04D 29/665 416/232
7,980,817 B2 7/2011 Foose et al.
8,616,834 B2 * 12/2013 Knight, III .............. F01D 25/12 415/176
11,199,107 B2 * 12/2021 Reba ...................... B22F 5/009
11,566,564 B2 1/2023 Bifulco et al.
11,719,110 B2 8/2023 Villaro Amurrio
2008/0295518 A1 * 12/2008 Reba ........................ F02C 7/24 60/725
2021/0317753 A1 * 10/2021 Reba ...................... F02K 1/827

* cited by examiner

*Primary Examiner* — Eric J Zamora Alvarez
(74) *Attorney, Agent, or Firm* — Bachman & LaPointe, P.C.

(57) ABSTRACT

A structural guide vane with acoustic panel retention including an acoustic panel inserted into an acoustic panel receiver; a retention tab formed near a trailing edge of the acoustic panel; a leading edge extension formed near a leading edge of the acoustic panel; a tab receiver formed in the structural guide vane near a trailing edge of the structural guide vane; and a leading edge cap secured over the leading edge extension and leading edge of the structural guide vane to encapsulate and secure the acoustic panel into the acoustic receiver.

20 Claims, 4 Drawing Sheets

46
44
50
18
T
28
18
48
S

SGV ACOUSTIC LINER RETENTION

BACKGROUND

The present disclosure is directed to the improved acoustic panel retention for a structural guide vane.

Current gas turbine engine design, as seen in FIG. 1 through FIG. 4*a*, includes a design with variable or non-variable fan exit guide vanes (FEGV). The fan F is positioned within the fan duct FD proximate the engine inlet EI. The fan exit guide vanes (FEGV) are downstream from the fan F and located forward of the bypass duct BD.

A current FEGV pattern is created to minimize airflow back pressure adverse effect on fan blades F caused by the downstream presence of nacelle N bypass duct BD elements (FIG. 2), such as the upper and lower bifurcation (BiFi), air-to-oil cooler (AOC), and environmental control system inlet (ECS).

As seen in FIG. 3, the FEGV has a circumferential pattern CP made up of vanes V that can translate the structural load path LP shown as arrows in FIG. 4. All vane types are designed with the same cross sectional monolithic load carrying features (FIG. 4*a*). Additionally, the FEGV pattern aims to optimize the fan duct performance and acoustic characteristics of the gas turbine engine.

The FEGV pattern is defined to meet structural, performance and acoustic requirements across a wide range of operating conditions. It is therefore not optimized at any single mission condition, like cruise condition or climb condition. Engine noise targets are getting more challenging for future programs. Engine and airframe makers are looking for more opportunities for noise reduction. At the engine side, acoustic treatable areas are limited. Fan exit guide vanes are an area for noise reduction opportunities.

SUMMARY

In accordance with the present disclosure, there is provided a structural guide vane with acoustic panel retention comprising a leading edge and a trailing edge opposite chordwise from the leading edge; a radially inner attachment region opposite spanwise from a radially outer attachment region; a span dimension extending between the radially inner attachment region and the radially outer attachment region; a chord dimension extending between the leading edge and the trailing edge; a pressure side opposite a suction side of the structural guide vane; an acoustic panel receiver formed within the structural guide vane extendable at least one of spanwise through the structural guide vane between the radially inner attachment region and the radially outer attachment region or chordwise between the leading edge and the trailing edge; and an acoustic panel inserted into the acoustic panel receiver; a retention tab formed near a trailing edge of the acoustic panel; a leading edge extension formed near a leading edge of the acoustic panel; a tab receiver formed in the structural guide vane near the trailing edge of the structural guide vane; and a leading edge cap secured over the leading edge extension and leading edge of the structural guide vane to encapsulate and secure the acoustic panel into the acoustic receiver.

A further embodiment of any of the foregoing embodiments may additionally and/or alternatively include the acoustic panel is configured to be rotatably hinged, insertable into the acoustic panel receiver.

A further embodiment of any of the foregoing embodiments may additionally and/or alternatively include the acoustic panel receiver is located on the pressure side.

A further embodiment of any of the foregoing embodiments may additionally and/or alternatively include the tab receiver can be open ended such that the suction side is open or the tab receiver is closed such that the suction side is closed off.

A further embodiment of any of the foregoing embodiments may additionally and/or alternatively include the structural guide vane with acoustic panel retention further comprising acoustic treatment formed within the acoustic panel, the acoustic treatment configured to dissipate sound energy.

A further embodiment of any of the foregoing embodiments may additionally and/or alternatively include the retention tab can pivot within the tab receiver to be secured.

A further embodiment of any of the foregoing embodiments may additionally and/or alternatively include the retention tab abuts the structural guide vane near the pressure side within the tab receiver.

In accordance with the present disclosure, there is provided a gas turbine engine including a structural guide vane with acoustic panel retention comprising a fan located within a fan duct; and an array of structural guide vanes supported within the fan duct downstream from the fan, the array of structural guide vanes span across the fan duct attached to a radially inner surface of the fan duct and a radially outer surface of the fan duct; wherein each structural guide vane of the array of structural guide vanes comprises a leading edge and a trailing edge opposite chordwise from the leading edge; a radially inner attachment region opposite spanwise from a radially outer attachment region; a span dimension extending between the radially inner attachment region and the radially outer attachment region; a chord dimension extending between the leading edge and the trailing edge; a pressure side opposite a suction side of the fan exit guide vane; an acoustic panel receiver formed within the structural guide vane extendable at least one of spanwise through the structural guide vane between the radially inner attachment region and the radially outer attachment region or chordwise between the leading edge and the trailing edge; and an acoustic panel inserted into the acoustic panel receiver; a retention tab formed near a trailing edge of the acoustic panel; a leading edge extension formed near a leading edge of the acoustic panel; a tab receiver formed in the structural guide vane near the trailing edge of the structural guide vane; and a leading edge cap secured over the leading edge extension and leading edge of the structural guide vane to encapsulate and secure the acoustic panel into the acoustic receiver.

A further embodiment of any of the foregoing embodiments may additionally and/or alternatively include the acoustic panel is configured to be rotatably hinged, insertable into the acoustic panel receiver.

A further embodiment of any of the foregoing embodiments may additionally and/or alternatively include the retention tab presses against the structural guide vane to secure the acoustic panel within the acoustic receiver.

A further embodiment of any of the foregoing embodiments may additionally and/or alternatively include the leading edge cap overlaps the leading edge extension near the pressure side of the structural guide vane.

A further embodiment of any of the foregoing embodiments may additionally and/or alternatively include the leading edge cap can be attached with the structural guide vane and acoustic panel configured to allow for the acoustic panel to have thermal growth in the absence of distortion created by thermal-induced stress/strain in the acoustic panel.

A further embodiment of any of the foregoing embodiments may additionally and/or alternatively include the leading edge cap can be attached with the structural guide vane by use of adhesive.

In accordance with the present disclosure, there is provided a process for creating gas turbine engine including a structural guide vane with acoustic panel retention comprising: supporting an array of structural guide vanes within a fan duct downstream from a location associated with a fan; attaching the array of structural guide vanes spanned across the fan duct to a radially inner surface of the fan duct and a radially outer surface of the fan duct; coupling a radially inner attachment region of each structural guide vane of the array of structural guide vanes in operative communication with the radially inner surface of the fan duct; coupling a radially outer attachment region of each structural guide vane of the array of structural guide vanes in operative communication with the radially outer surface of the fan duct; forming an acoustic panel receiver within each structural guide vane extending at least one of spanwise through the structural guide vane between the radially inner attachment region and the radially outer attachment region or chordwise between a leading edge and a trailing edge of each structural guide vane; inserting an acoustic panel into the acoustic panel receiver; forming a retention tab near a trailing edge of the acoustic panel; forming a leading edge extension near a leading edge of the acoustic panel; forming a tab receiver in the structural guide vane near the trailing edge of the structural guide vane; and encapsulating a leading edge cap over the leading edge extension and leading edge of the structural guide vane to secure the acoustic panel with the acoustic receiver.

A further embodiment of any of the foregoing embodiments may additionally and/or alternatively include the process further comprising configuring the acoustic panel to be rotatably hinged, insertable into the acoustic panel receiver.

A further embodiment of any of the foregoing embodiments may additionally and/or alternatively include the process further comprising forming the acoustic treatment within the acoustic panel; and configuring the acoustic treatment to dissipate sound energy.

A further embodiment of any of the foregoing embodiments may additionally and/or alternatively include the process further comprising pressing retention tab against the structural guide vane to secure the acoustic panel within the acoustic receiver.

A further embodiment of any of the foregoing embodiments may additionally and/or alternatively include the process further comprising overlapping the leading edge cap over the leading edge extension near the pressure side of the structural guide vane.

A further embodiment of any of the foregoing embodiments may additionally and/or alternatively include the process further comprising pivoting the retention tab within the tab receiver to secure the acoustic panel within the acoustic receiver.

A further embodiment of any of the foregoing embodiments may additionally and/or alternatively include the process further comprising attaching the leading edge cap with the structural guide vane and acoustic panel; and allowing for thermal growth of the acoustic panel in the absence of distortion created by thermal-induced stress/strain in the acoustic panel.

Other details of the interchangeable acoustic strips and panels for fan exit guide vane structure are set forth in the following detailed description and the accompanying drawings wherein like reference numerals depict like elements.

FIG. **5*a*** is a sectional view of schematic representation of the exemplary structural guide vane with acoustic treatment.

Figures 6, 7:
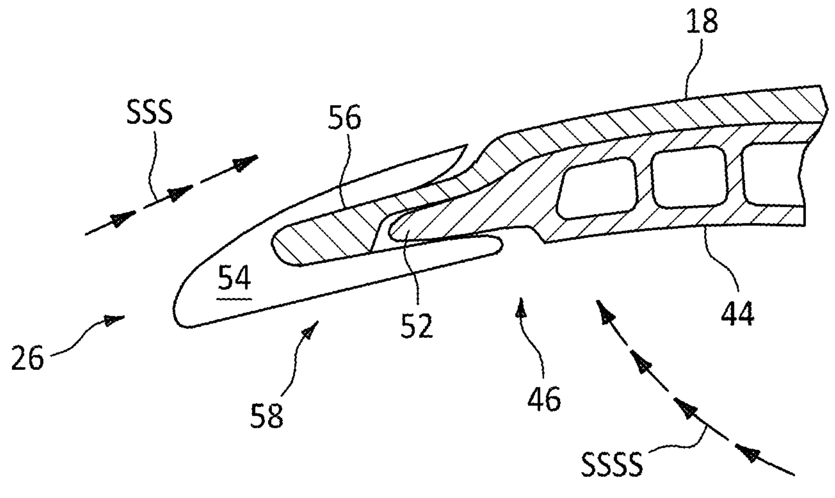

FIG. 6 is a partial cross-section schematic representation of exemplary structural exit vane with acoustic panel.

FIG. 7 is a partial cross-section schematic representation of exemplary structural exit vane with acoustic panel.

DETAILED DESCRIPTION

Figure 1:
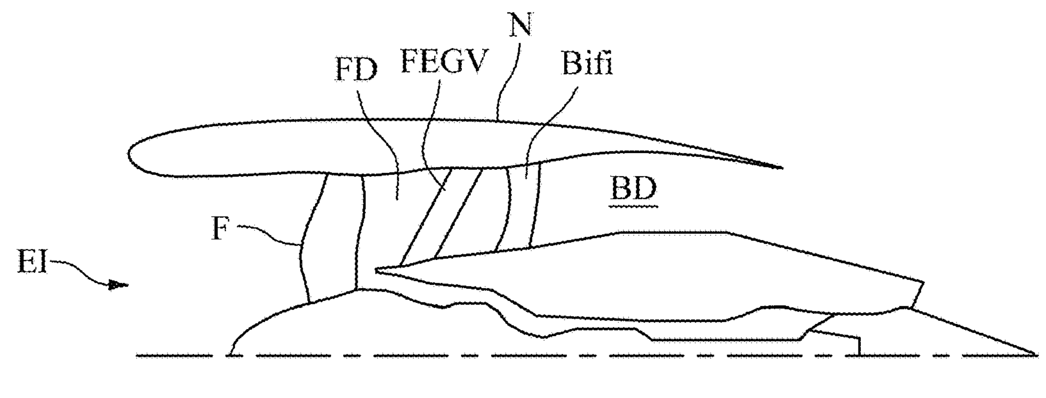
FIG. 1 is a schematic representation of a prior art gas turbine engine.
Figure 2:
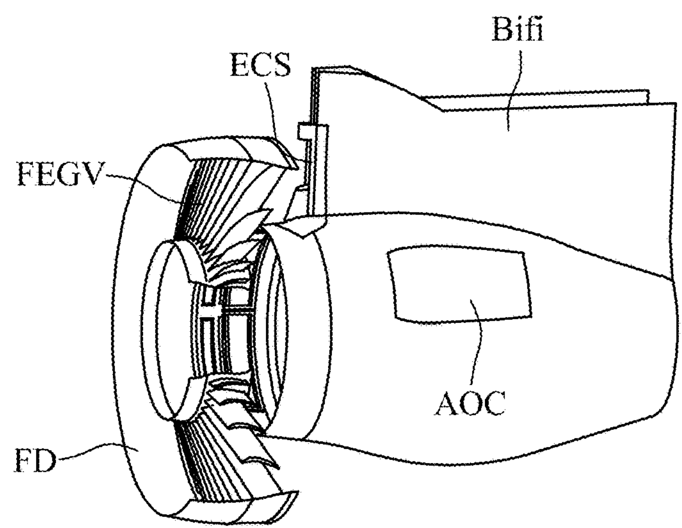
FIG. 2 is a schematic representation of a prior art gas turbine engine.
Figure 3:
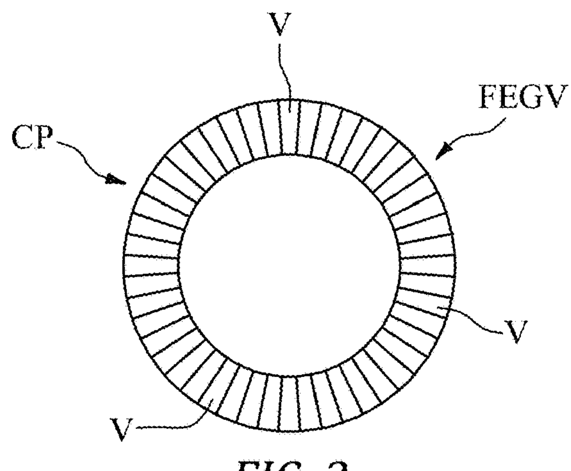
FIG. 3 is a schematic representation of a prior art fan exit guide vane pattern.
Figure 4:
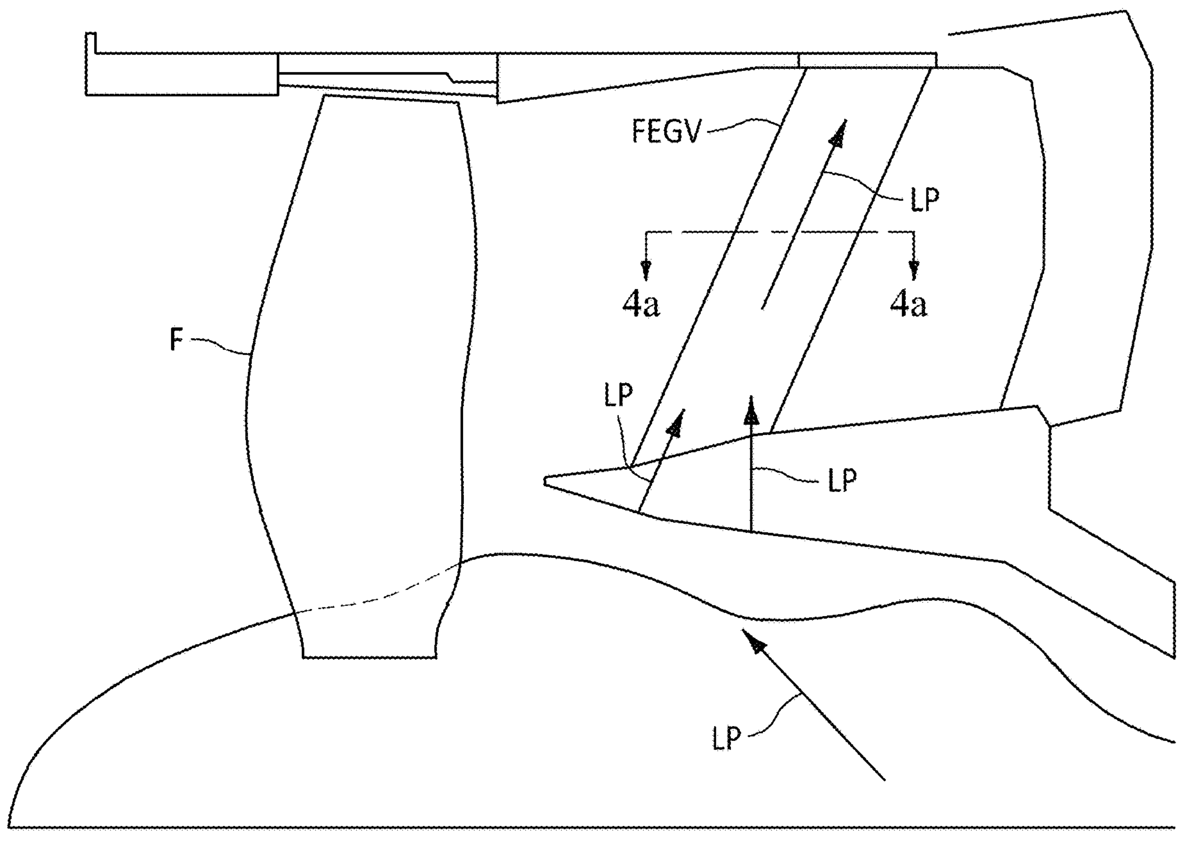
FIG. 4 is a schematic representation of a prior art fan exit guide vane with load path.
Figure 4A:
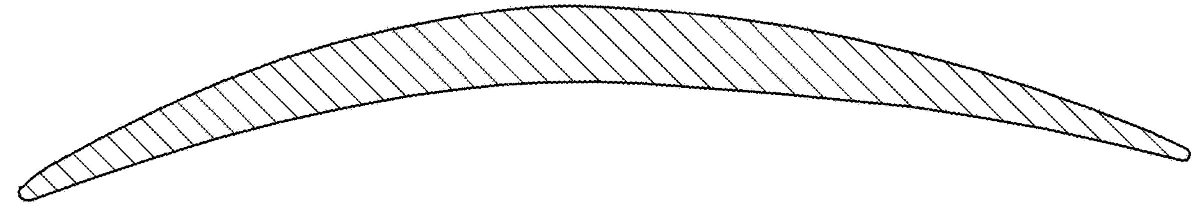
FIG. 4A is a sectional view schematic representation of the prior art fan exit guide vane FIG. 4.
Figure 5:
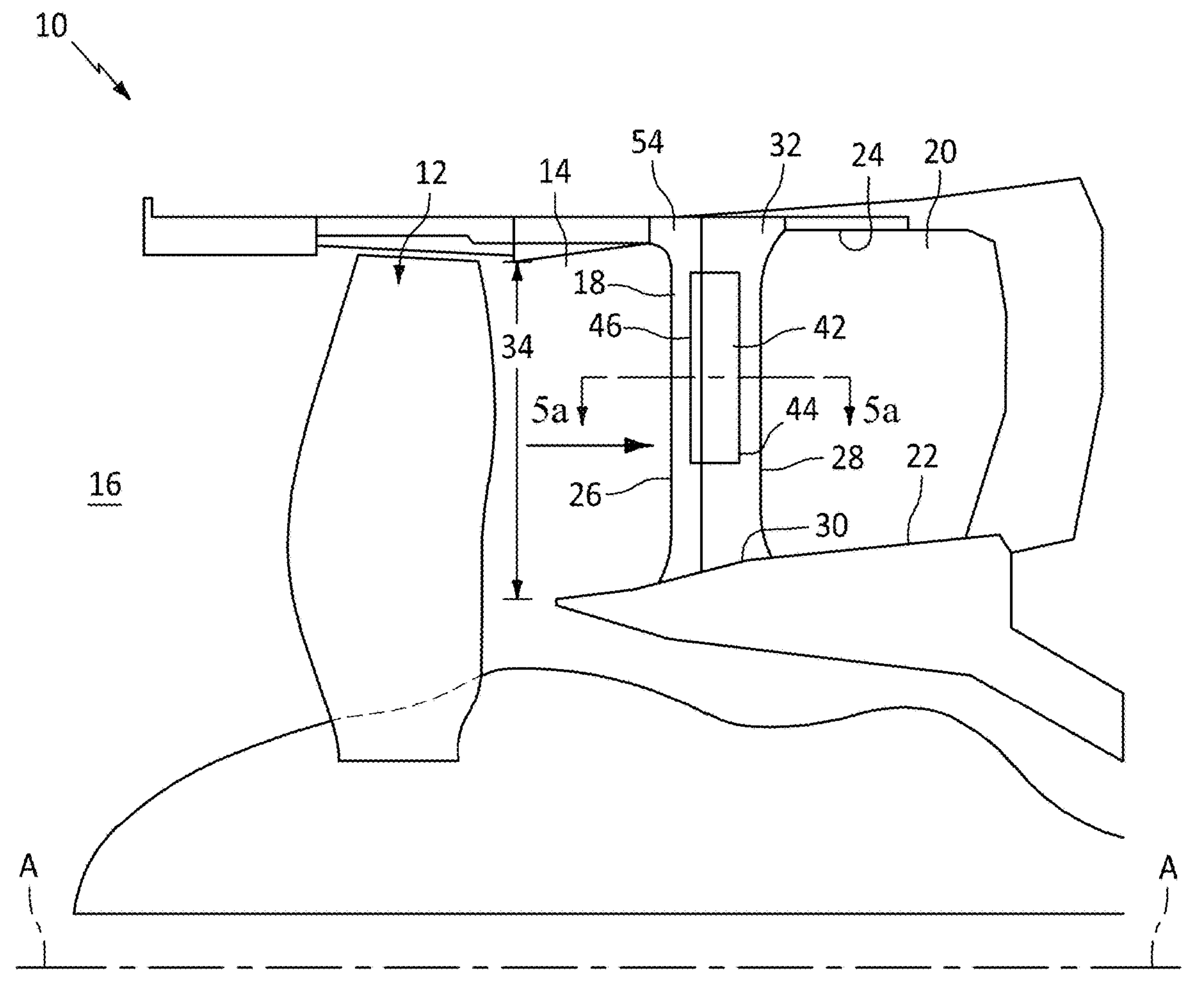
FIG. 5 is a schematic representation of an exemplary structural guide vane with acoustic treatment.

Referring now to FIG. 5 showing a schematic of a gas turbine engine 10. The gas turbine engine 10 includes a fan 12 with fan blades within a fan duct 14 proximate an engine inlet 16. Downstream from the fan 12 is a fan exit guide vane/structural guide vane (SGV) 18 upstream from a bypass duct 20.

The structural guide vane 18 spans across the fan duct 14 attached to a radially inner surface 22 of the fan duct 14 and a radially outer surface 24 of the fan duct 14.

With reference also to FIG. **5*a*, the structural guide vane 18 includes a leading edge 26 and a trailing edge 28 opposite chordwise from the leading edge 26**.

The structural guide vane 18 includes a radially inner attachment region 30 proximate the radially inner surface 22. The structural guide vane 18 includes a radially outer attachment region 32 proximate the radially outer surface 24. The radially inner attachment region 30 is opposite spanwise from the radially outer attachment region 32. The radially inner attachment region 30 of the structural guide vane 18 attaches to the fan duct 14 at the radially inner surface 22. The radially outer attachment region 32 of the structural guide vane 18 attaches to the fan duct 14 at the radially outer surface 24.

The structural guide vane 18 includes a span 34 dimension extending between the radially inner attachment region 30 and the radially outer attachment region 32. The structural guide vane 18 includes a chord dimension 36 extending between the leading edge 26 and the trailing edge 28, as seen in FIG. **5*a*. The structural guide vane 18 includes a pressure side 38 opposite a suction side 40**.

The structural guide vane 18 shown in FIG. 5 is oriented generally vertical, that is along a similar radial span between the radially inner surface 22 and radially outer surface 24 relative to the axis A. Alternatively, the structural guide vane 18 can include a canted orientation. In an exemplary embodiment, the vane stacking axis can be canted aft, that is the radially inner attachment region is forward of the radially outer attachment region 32.

The structural guide vane 18 can include an acoustic treatment 42. The acoustic treatment 42 can be any material or structure configured to dissipate sound energy. The acoustic treatment 42 can include various materials and/or structures with sound-absorbing and diffusing properties. The materials of the acoustic treatment 42 can include, but are not limited to composites, metals, plastics, foams, and the like. The acoustic treatment 42 is porous and/or shaped in a form that includes a plurality of cavities with a high surface area to fill ratio (e.g., many nooks and crannies) to enable the acoustic energy to enter and dissipate within. The acoustic treatment 42 can be formed within an acoustic panel 44 that can be shaped to influence acoustic dampening capability. For example, the material may include a honeycomb structure, which enables significant acoustic dampening. In an exemplary embodiment the acoustic treatment 42 can provide a broadband noise benefit from about 0.5 to 2 EPNdB. The acoustic treatment 42 can be varied from one structural guide vane 18 to another. The variation can be by varying the materials, the shape, and the location of the acoustic treatment 42.

Figure 5A:
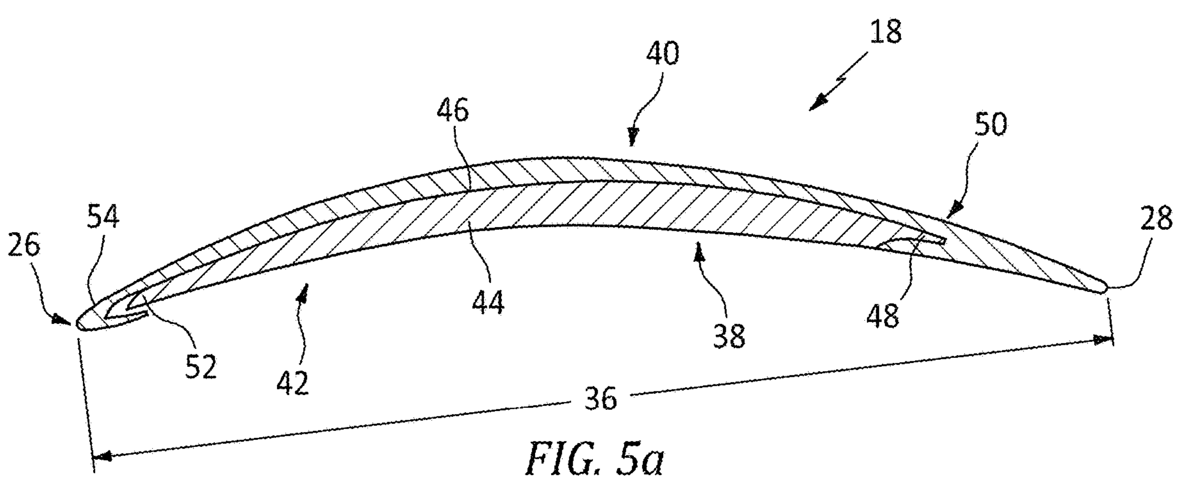

The acoustic treatment 42 can be formed as an acoustic panel 44 having cross section shape configured to be inserted into an acoustic panel receiver 46 as seen in cross section at FIG. 5*a*. The acoustic panel receiver 46 can have a cross sectional shape that allows for securing the acoustic panel 44 as well as allowing for insertion of the acoustic panel 44 into the acoustic panel receiver 46. The acoustic panel receiver 46 can be sized to allow for thermal growth of the acoustic panel 44 as well as for tolerance variation of the mating parts. The acoustic panel receiver 46 can have a rectangular cross section, oval cross section and the like (e.g., different shapes, combinations of shapes, etc.). The acoustic panel receiver 46 can be formed on the pressure side 38 and/or the suction side 40 of the structural guide vane 18. The acoustic panel receiver 46 can be aligned along the span 34. The acoustic panel receiver 46 can be aligned chordwise.

Referring also to FIG. 6 and FIG. 7, the acoustic panel 44 can be configured to be inserted into the acoustic panel receiver 46. The acoustic panel 44 is configured to be rotatably hinged, insertable as a snap fit or friction fit into the acoustic panel receiver 46. The hinged nature is configured so that the panel 44 would rotate and slide into the structural guide vane 18 into the receiver 46 (during fabrication of the fan exit guide vane 18) and would be trapped by the geometry of the receiver 46. The acoustic panel 44 can be installed into the acoustic panel receiver 46 from the radially inner attachment region 30, and/or radially outer attachment region 32, leading edge 26 and/or trailing edge 28 and/or mid-span and the like.

The acoustic panel 44 can include a retention tab 48 shown at FIG. 5*a* and FIG. 7. The retention tab 48 can be an extension of the acoustic panel 44 with a narrow thickness T. The retention tab 48 can be insertable to a tab receiver 50 formed in the panel receiver 46 near the trailing edge 28. The tab receiver 50 can be open ended or closed. The version shown in FIG. 5*a* is closed. That is, the suction side 40 is closed off. The version shown in FIG. 7 is open ended, that is open to the pressure side 38 as well as the suction side 40. The retention tab 48 can pivot into place as shown by the multi-arrows S. The retention tab 48 can pivot within the tab receiver 50 to be secured. The retention tab 48 can press against the structural guide vane 18, to secure the acoustic panel 44 within the acoustic receiver 50. As shown in FIG. 7, the retention tab 48 abuts the structural guide vane 18 near the pressure side 38 within the tab receiver 50. The acoustic panel 44 can be swung into a secured position within the acoustic receiver 46 to nest within the acoustic receiver 46 as shown by the multi-arrows SSSS. The retention tab 48 can be separate discrete portions of the acoustic panel 44 that are spaced across the span of the acoustic panel 44. The retention tab 48 can form a saw tooth edge, notched edge, crenulated edge, and the like. In another embodiment, the retention tab 48 can be a continuous portion of the acoustic panel 44 that extends along the span of the acoustic panel 44 near the trailing edge 28. The tab receiver 50 can be formed to match the shape of the retention tab 48 for ease of joining.

The acoustic panel 44 can also include a leading edge extension 52 shown in FIG. 5*a* and FIG. 6. The leading edge extension 52 can be the end/edge of the acoustic panel 44 that extends near the leading edge 26 of the structural guide vane 18. The leading edge extension 52 can be opposite the retention tab 48 chordwise on the acoustic panel 44.

A leading edge sheath/cap 54 can be secured over the leading edge extension 52 and leading edge of the structural guide vane 26 to encapsulate and secure the acoustic panel 44 into the acoustic receiver 46. The leading edge sheath/cap 54 can extend along the span 34 of the structural guide vane 18. The leading edge cap 54 slides over the leading edge extension 52 and leading edge 26 as shown by the multi-arrows SSS. The leading edge cap 54 can be manufactured separately from the structural guide vane 18. The leading edge cap 54 can be attached with the structural guide vane 18 by use of adhesive 56. The adhesive 56 can be applied to the joint between the leading edge cap 54 and the structural guide vane 18 on the suction side 40, as shown in FIG. 6. In an alternative embodiment, the leading edge cap 26 can retain the acoustic panel 44 without adhesive to allow for relative motion between the acoustic panel 44 and leading edge cap 54. The leading edge cap 54 can trap the acoustic panel 44. The leading edge cap 54 can overlap the leading edge extension 52 near the pressure side 38. The leading edge cap 54 and acoustic panel 44 can form a lap joint 58 that captures the front of the acoustic panel 44.

The acoustic panel 44 can be interchangeable to accommodate design changes and/or damage to the acoustic panel 44. The acoustic panel 44 can be shaped to influence the acoustic capability in the proximity of the structural guide vane 18. For example, the acoustic panel 44 can include a physical shape, depth, width, height, or other dimension that influences the acoustic capability thereof. The acoustic panel 44 can be varied from one structural guide vane 18 to another. The variation can be by varying the materials, the shape and the location of the acoustic panel 44. Though illustrated in FIG. 5 as having acoustic panel 44 on a single structural guide vane 18 of the same shape, this is not intended to be so limiting and the acoustic panels 44 on a single structural guide vane 18 may include the same or different shapes, sizes, and orientations (e.g., one or more oriented chordwise, one or more oriented spanwise). The material, shape, and location of the acoustic panel 44 may also vary between structural guide vanes 18.

A technical advantage of the disclosed acoustic panel retention for a structural guide vane includes a capacity to dampen acoustic noise along the surfaces of structural guide vanes.

Another technical advantage of the disclosed acoustic panel retention for a structural guide vane includes structural features formed in the structural guide vanes configured to receive acoustic panels.

Another technical advantage of the disclosed acoustic panel retention for a structural guide vane includes interchangeable panels with acoustic treatment.

Another technical advantage of the disclosed acoustic panel retention for a structural guide vane includes primary retention provided by liner tabs that engage corresponding recesses in the structural guide vane body.

Another technical advantage of the disclosed acoustic panel retention for a structural guide vane includes a system to retain the acoustic panel without the use of retainers or small fasteners.

Another technical advantage of the disclosed acoustic panel retention for a structural guide vane includes no need to use bonding or other joining techniques outside the sheath bond.

Another technical advantage of the disclosed acoustic panel retention for a structural guide vane includes a system that allows for thermal growth without creating excessive thermal-induced stress/strain in the acoustic panel.

Another technical advantage of the disclosed acoustic panel retention for a structural guide vane includes limiting the interruption to the flow path as compared to other systems.

There has been provided an acoustic panel retention for a structural guide vane. While the acoustic panel retention for a structural guide vane has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A structural guide vane with acoustic panel retention comprising:

a leading edge and a trailing edge opposite chordwise from the leading edge; a radially inner attachment region opposite spanwise from a radially outer attachment region; a span dimension extending between the radially inner attachment region and the radially outer attachment region; a chord dimension extending between the leading edge and the trailing edge; a pressure side opposite a suction side of the structural guide vane;

an acoustic panel receiver formed within the structural guide vane extendable at least one of spanwise through the structural guide vane between the radially inner attachment region and the radially outer attachment region or chordwise between the leading edge and the trailing edge; and an acoustic panel inserted into the acoustic panel receiver;

a retention tab formed near a trailing edge of the acoustic panel;

a leading edge extension formed near a leading edge of the acoustic panel;

a tab receiver formed in the structural guide vane near the trailing edge of the structural guide vane; and a leading edge cap secured over the leading edge extension and the leading edge of the structural guide vane to encapsulate and secure the acoustic panel into the acoustic receiver.

2. The structural guide vane with acoustic panel retention according to claim 1, wherein the acoustic panel is configured to be rotatably hinged, insertable into the acoustic panel receiver.

3. The structural guide vane with acoustic panel retention according to claim 1, wherein the acoustic panel receiver is located on the pressure side.

4. The structural guide vane with acoustic panel retention according to claim 1, wherein the tab receiver can be open ended such that the suction side is open or the tab receiver is closed such that the suction side is closed off.

5. The structural guide vane with acoustic panel retention according to claim 1, further comprising:

acoustic treatment formed within the acoustic panel, the acoustic treatment configured to dissipate sound energy.

6. The structural guide vane with acoustic panel retention according to claim 1, wherein the retention tab can pivot within the tab receiver to be secured.

7. The structural guide vane with acoustic panel retention according to claim 1, wherein the retention tab abuts the structural guide vane near the pressure side within the tab receiver.

8. A gas turbine engine including a structural guide vane with acoustic panel retention comprising:

a fan located within a fan duct; and an array of structural guide vanes supported within the fan duct downstream from the fan, the array of structural guide vanes span across the fan duct attached to a radially inner surface of the fan duct and a radially outer surface of the fan duct;

wherein each structural guide vane of the array of structural guide vanes comprises:

a leading edge and a trailing edge opposite chordwise from the leading edge; a radially inner attachment region opposite spanwise from a radially outer attachment region;

a span dimension extending between the radially inner attachment region and the radially outer attachment region;

a chord dimension extending between the leading edge and the trailing edge; a pressure side opposite a suction side of the fan exit guide vane;

an acoustic panel receiver formed within the structural guide vane extendable at least one of spanwise through the structural guide vane between the radially inner attachment region and the radially outer attachment region or chordwise between the leading edge and the trailing edge; and an acoustic panel inserted into the acoustic panel receiver;

a retention tab formed near a trailing edge of the acoustic panel;

a leading edge extension formed near a leading edge of the acoustic panel;

a tab receiver formed in the structural guide vane near the trailing edge of the structural guide vane; and a leading edge cap secured over the leading edge extension and the leading edge of the structural guide vane to encapsulate and secure the acoustic panel into the acoustic receiver.

9. The gas turbine engine including a structural guide vane with acoustic panel retention according to claim 8, wherein the acoustic panel is configured to be rotatably hinged, insertable into the acoustic panel receiver.

10. The gas turbine engine including a structural guide vane with acoustic panel retention according to claim 8, wherein the retention tab presses against the structural guide vane to secure the acoustic panel within the acoustic receiver.

11. The gas turbine engine including a structural guide vane with acoustic panel retention according to claim 8, wherein the leading edge cap overlaps the leading edge extension near the pressure side of the structural guide vane.

12. The gas turbine engine including a structural guide vane with acoustic panel retention according to claim 8, wherein the leading edge cap can be attached with the structural guide vane and acoustic panel configured to allow for the acoustic panel to have thermal growth in an absence of distortion created by thermal-induced stress/strain in the acoustic panel.

13. The gas turbine engine including a structural guide vane with acoustic panel retention according to claim 8, wherein the leading edge cap can be attached with the structural guide vane by use of adhesive.

14. A process for a creating gas turbine engine including a structural guide vane with acoustic panel retention comprising:

supporting an array of structural guide vanes within a fan duct downstream from a location associated with a fan;

attaching the array of structural guide vanes spanned across the fan duct to a radially inner surface of the fan duct and a radially outer surface of the fan duct;

coupling a radially inner attachment region of each structural guide vane of the array of structural guide vanes in operative communication with the radially inner surface of the fan duct;

coupling a radially outer attachment region of each structural guide vane of the array of structural guide vanes in operative communication with the radially outer surface of the fan duct;

forming an acoustic panel receiver within each structural guide vane extending at least one of spanwise through the structural guide vane between the radially inner attachment region and the radially outer attachment region or chordwise between a leading edge and a trailing edge of each structural guide vane;

inserting an acoustic panel into the acoustic panel receiver;

forming a retention tab near a trailing edge of the acoustic panel;

forming a leading edge extension near a leading edge of the acoustic panel;

forming a tab receiver in the structural guide vane near the trailing edge of the structural guide vane; and encapsulating a leading edge cap over the leading edge extension and the leading edge of the structural guide vane to secure the acoustic panel with the acoustic receiver.

15. The process of claim 14, further comprising:

configuring the acoustic panel to be rotatably hinged, insertable into the acoustic panel receiver.

16. The process of claim 14, further comprising:

forming the acoustic treatment within the acoustic panel; and configuring the acoustic treatment to dissipate sound energy.

17. The process of claim 14, further comprising:

pressing the retention tab against the structural guide vane to secure the acoustic panel within the acoustic receiver.

18. The process of claim 14, further comprising:

overlapping the leading edge cap over the leading edge extension near the pressure side of the structural guide vane.

19. The process of claim 14, further comprising:

pivoting the retention tab within the tab receiver to secure the acoustic panel within the acoustic receiver.

20. The process of claim 14, further comprising:

attaching the leading edge cap with the structural guide vane and acoustic panel; and allowing for thermal growth of the acoustic panel in an absence of distortion created by thermal-induced stress/strain in the acoustic panel.

* * * * *